US008321377B2

(12) United States Patent
Michael et al.

(10) Patent No.: US 8,321,377 B2
(45) Date of Patent: Nov. 27, 2012

(54) CREATING HOST-LEVEL APPLICATION-CONSISTENT BACKUPS OF VIRTUAL MACHINES

(75) Inventors: Michael L. Michael, Redmond, WA (US); William L. Scheidel, Sammamish, WA (US); Paul Brandon Luber, Redmond, WA (US); Paul Adrian Oltean, Redmond, WA (US); Ran Kalach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 25 days.

(21) Appl. No.: 11/405,236

(22) Filed: Apr. 17, 2006

(65) Prior Publication Data

US 2007/0244938 A1 Oct. 18, 2007

(51) Int. Cl.
 *G06F 17/00* (2006.01)
(52) U.S. Cl. ........ 707/639; 707/640; 707/649; 707/822; 707/831
(58) Field of Classification Search .......... 707/10, 707/204, 1, 640, 654, 769, 822, 639, 649, 707/831; 711/161, 162
 See application file for complete search history.

(56) References Cited

U.S. PATENT DOCUMENTS

| 5,475,834 | A | | 12/1995 | Anglin et al. |
| 5,664,186 | A | * | 9/1997 | Bennett et al. ......... 707/999.204 |
| 6,247,141 | B1 | | 6/2001 | Homberg |
| 6,269,431 | B1 | | 7/2001 | Dunham |
| 6,327,579 | B1 | | 12/2001 | Crawford |
| 6,643,671 | B2 | * | 11/2003 | Milillo et al. ................. 707/639 |
| 6,714,980 | B1 | | 3/2004 | Markson et al. |
| 6,735,601 | B1 | * | 5/2004 | Subrahmanyam ......... 707/999.2 |
| 6,883,073 | B2 | * | 4/2005 | Arakawa et al. .............. 711/162 |
| 6,993,761 | B1 | * | 1/2006 | Czajkowski et al. ......... 709/202 |
| 7,085,899 | B2 | | 8/2006 | Kim et al. |
| 7,093,086 | B1 | * | 8/2006 | van Rietschote ............. 711/161 |
| 7,275,136 | B1 | | 9/2007 | Chen |
| 7,356,658 | B2 | * | 4/2008 | Satoyama et al. ..... 707/999.204 |
| 7,373,451 | B2 | * | 5/2008 | Lam et al. ........................ 711/6 |
| 7,404,056 | B1 | * | 7/2008 | Nordquist ..................... 711/166 |

(Continued)

FOREIGN PATENT DOCUMENTS

EP 1 357 465 10/2003

(Continued)

OTHER PUBLICATIONS

Subrahmanyam, Distributed Execution of a Program Using Streaming, 2004, U.S. Appl. No. 10/837964, Specification, pp. 1-45.*

(Continued)

*Primary Examiner* — Christyann Pulliam
*Assistant Examiner* — Rezwanul Mahmood
(74) *Attorney, Agent, or Firm* — Woodcock Washburn LLP

(57) ABSTRACT

A host server hosting one or more virtual machines can back up host volumes and the one or more virtual machines installed thereon in an application-consistent manner. In one implementation, a host-level requestor instructs a host-level writer to identify which virtual machines qualify for application-consistent backups. The host-level requestor then instructs the host-level writer to initiate virtual machine backups through guest-level requesters in each appropriately-configured virtual machine, wherein the virtual machines create application-consistent backups within the virtual machine volumes. The host-level requester then initiates snapshots of the server volumes on the host-level. The virtual machine-level snapshots can thus be retrieved from within the host-level snapshots of the server volumes.

16 Claims, 5 Drawing Sheets

U.S. PATENT DOCUMENTS

| | | | |
|---|---|---|---|
| 7,669,020 B1* | 2/2010 | Shah et al. | 711/162 |
| 7,689,859 B2* | 3/2010 | Westenberg | 714/6.11 |
| 7,707,185 B1* | 4/2010 | Czezatke et al. | 707/649 |
| 7,774,391 B1* | 8/2010 | Le et al. | 707/822 |
| 7,899,788 B2* | 3/2011 | Chandhok et al. | 707/640 |
| 8,032,351 B2* | 10/2011 | Stringham | 703/21 |
| 8,056,076 B1* | 11/2011 | Hutchins et al. | 707/639 |
| 8,060,476 B1* | 11/2011 | Afonso et al. | 707/649 |
| 2003/0120856 A1* | 6/2003 | Neiger et al. | 711/6 |
| 2003/0131207 A1 | 7/2003 | Arakawa et al. | |
| 2003/0204597 A1 | 10/2003 | Arakawa et al. | |
| 2004/0064813 A1* | 4/2004 | Neiger et al. | 718/1 |
| 2004/0083345 A1 | 4/2004 | Kim et al. | |
| 2004/0205390 A1 | 10/2004 | Kanevsky et al. | |
| 2005/0033930 A1 | 2/2005 | Haruma et al. | |
| 2005/0044162 A1* | 2/2005 | Liang et al. | 707/9 |
| 2005/0138204 A1 | 6/2005 | Iyer et al. | |
| 2005/0262377 A1 | 11/2005 | Sim-Tang | |
| 2005/0267920 A1 | 12/2005 | Helliker et al. | |
| 2006/0085784 A1* | 4/2006 | Traut et al. | 718/1 |
| 2006/0136720 A1* | 6/2006 | Armstrong et al. | 713/164 |
| 2007/0094659 A1* | 4/2007 | Singh et al. | 718/1 |
| 2007/0239804 A1* | 10/2007 | Armstrong et al. | 707/204 |
| 2007/0260831 A1* | 11/2007 | Michael et al. | 711/162 |
| 2008/0133208 A1* | 6/2008 | Stringham | 703/20 |
| 2008/0281884 A1* | 11/2008 | Subrahmanyam | 707/205 |
| 2009/0113423 A1* | 4/2009 | Hiltgen et al. | 718/1 |
| 2009/0199177 A1* | 8/2009 | Edwards et al. | 718/1 |
| 2009/0222496 A1* | 9/2009 | Liu et al. | 707/204 |
| 2010/0005258 A1* | 1/2010 | Westenberg | 711/162 |
| 2010/0011178 A1* | 1/2010 | Feathergill | 711/162 |
| 2010/0077165 A1* | 3/2010 | Lu et al. | 711/162 |
| 2011/0010515 A1* | 1/2011 | Ranade | 711/162 |

FOREIGN PATENT DOCUMENTS

| | | |
|---|---|---|
| EP | 1 380 947 | 1/2004 |
| EP | 1 640 867 | 3/2006 |
| JP | 2003-202964 A | 7/2003 |
| JP | 2004-133894 A | 4/2004 |
| JP | 2005-332223 A | 12/2005 |
| JP | 2006-018814 A | 1/2006 |
| RU | 2259582 C2 | 8/2005 |
| WO | WO 02/097624 | 12/2002 |
| WO | WO2004/021677 | 3/2004 |

OTHER PUBLICATIONS

Data Protection—Perform Zero Downtime Backups [online] [retrieved on Jan. 2, 2006]. Retrieved from the Internet URL: http://www.hp.com/sbso/bus_protect/data_protect/zero_downtime.html.

HP OpenView Storage Data Protector 5.1 Software [online] [retrieved on Jan. 2, 2006]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 2, 2006]. Retrieved from the Internet URL: http://www.shadowstor.com/documents/ShadowProtectdsheet.pdf.

* cited by examiner

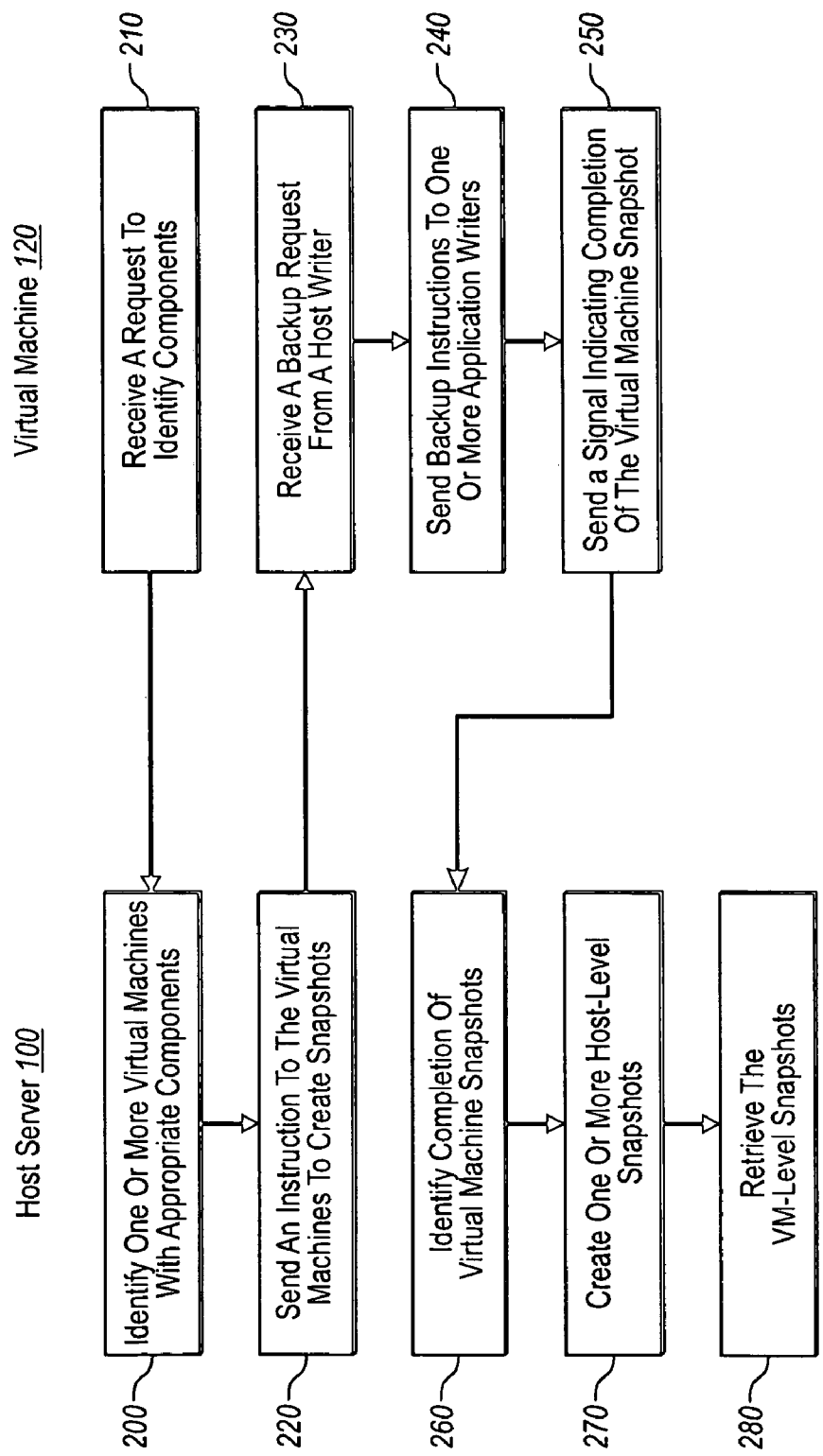

CREATING HOST-LEVEL APPLICATION-CONSISTENT BACKUPS OF VIRTUAL MACHINES

CROSS-REFERENCE TO RELATED APPLICATIONS

N/A

BACKGROUND

Background and Relevant Art

As computerized systems have increased in popularity, so have the needs to store and back up electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

As computerized systems are continually developed into more complex software and hardware configurations, the complications associated with backing up these configurations has also increased. In its simplest form, backing up a computer involves simply copying information from a computer disk or volume, and passing that information to a backup location. Simply copying data from a disk, however, becomes much more complex when backing up large sets of data on multiple servers on a network, particularly when the sets of data are continually changing during the backup process. For example, along with simply backing up data, some concerns for large organizations can include a need to store data in a quick, reliable, and relatively uninterrupted fashion so that the data are also quickly recoverable. Additional concerns include how to access various server data in the first instance, particularly as each server may have different functions that may make the server more or less accessible to a given backup program than another server.

These types of complications in backing up server data can be particularly difficult in the virtualized server environment. Generally, a virtual server environment involves the use of a host server, on which one or more "virtual machines" can be installed. These virtual machines, comprise unique instances of an operating system that are installed on an allocated portion of the host server disk space and resources (e.g., host memory), and thus comprise a distinct machine boundary. Thus, each virtual machine could be represented by a unique network identifier, and thus appear separate and distinct on a network from the host server itself. In addition, each virtual machine can also have additional storage partitions made on the host space allocated for the virtual machine. Furthermore, in addition to appearing to be a distinct machine from the host server, the virtual machine can also appear to be hosting multiple drives or volumes, despite existing on the physical disk(s) of a host server. Accordingly, one can appreciate that virtual machines can be used in a number of important ways to more efficiently distribute hardware resources in an organization.

Despite these advantages, it is not a simple matter to simply copy the host volumes on which the virtual machines are installed and have that data be as useful (e.g., consistent and valid) as necessary. One of the reasons for this difficulty stems from the nature of the virtual machines themselves, whereby they are deemed to have distinct identities (e.g., including distinct operating systems) with respect to other virtual machines, and with respect to the corresponding host server(s). For example, the host server cannot simply instruct applications inside the virtual machine to create an "application-consistent" snapshot of their data, since such applications are generally under the control of the virtual machine. Thus, when a host creates a snapshot or a backup copy of the volume (or volumes) on which the virtual machine is installed, processes inside the virtual machine may continue to run, and as such, a copy of the virtual machine could likely include data and file state that are valid for different instances of time. That is, the copy of the virtual machine data would not be "application-consistent." If you were to restore such a virtual machine, it may not even function properly, if at all.

Generally, an "application-consistent" backup means that applications take part in the backup preparation processes, and produce application files to be backed up based on what is on the physical disk, as well as what is in memory. As such, these files or snapshots to be backed up are consistent with the current state of the application, and are recoverable by the application at a later point. By contrast, "crash-consistent" data refer to data that are backed up generally without the benefit of involving the applications used to create the data in the first instance. As a result, the primary production during a crash-consistent backup is a set of data that are the same as what are on the physical disk during the backup process without consideration for what is in memory, and without a consideration for application state. This is similar to how file data might exist during a total system crash, such as during a loss of power or reboot, and thus has no guarantees of being, for example, application-consistent. In particular, for certain complex operating environments, particularly where it is important to ensure as seamless a transition as possible after a backup, a consistent (i.e., application and/or file system)-consistent backup approach is preferred.

There are a variety of ways for creating a consistent backup of volume data. Unfortunately, conventional systems that attempt to create application-consistent backups of virtual machines (and corresponding volumes managed thereby) generally cannot effectively create an application-consistent backup without first pausing or turning off the virtual machine. This typically results in some unwanted downtime, which, in some cases with certain "mission-critical" software could create particular difficulties for an administrator. One reason for this is so that the volume of interest can be copied while no additional writes are being made to the volume, such that the data generated through the application are all consistent for the same instance of time. Of course, in an environment where ready, continuous and efficient data access is important, pausing or turning off a virtual machine to make a backup copy is less desirable, and can create a drain on an organization's resources.

Other ways that an organization might attempt to create application-consistent backups of a virtual machine is by installing a specific backup agent within each instance of a given virtual machine. Generally, a backup agent will be configured to interact with the application writers within the operating system to create an application-consistent backup, just as might normally be done on the host level for the host server's main volume. Unfortunately, it is not a simple matter to just install new backup agents for each virtual machine. For example, an organization will typically need to purchase a new separate backup agent (or license) for each virtual machine, and then install each backup agent within the virtual machine. One will appreciate that this can present a fairly significant difficulty in terms of cost and resource expenditures (e.g., including management overhead) to large organizations that might be running tens, hundreds, or even thousands of virtual machines.

Accordingly, there are a number of difficulties associated with backing up virtual machines that can be addressed.

BRIEF SUMMARY

Implementations of the present invention provide systems, methods, and computer program products configured to create consistent host-level backups of one or more virtual machines. In particular, implementations of the present invention provide the ability to backup a host server and corresponding one or more virtual machines using existing backup requestors and writers in a consistent fashion, without necessarily incurring significant interruptions to the operation of the one or more virtual machines. In one implementation, for example, a host server writer (e.g., a virtual server VSS writer) instructs each virtual machine to create one or more application-consistent snapshots of its own virtual machine-level volume data. The backup application on the host server also creates snapshots of the host-level volumes on which one or more virtual machines (e.g., a Virtual Hard Disk file thereof) are installed. The host server can then retrieve the previously created virtual machine-level snapshots from within the host-level snapshots, and finish backup processes.

For example, a method from the perspective of a host server of creating a consistent backup of virtual machine volume data without necessarily requiring stopping or rebooting of the one or more virtual machines, can involve identifying at least one virtual machine having one or more components for writer-involved backup processes. In addition, the method can involve sending an instruction to each of the one or more virtual machines to prepare a virtual machine-level, application-consistent snapshot. The method can also involve identifying that snapshot operations at the at least one virtual machine have completed. Furthermore, the method can involve creating one or more host-level snapshots of one or more host volumes on which the identified one or more virtual machines are installed. The method can still further involve retrieving the application-consistent snapshot of the virtual machine volumes made by the at least one virtual machine.

By contrast, a method from the perspective of a virtual machine of creating a consistent backup of one or more virtual machine volumes in response to instructions from a host writer of the host server can involve receiving a request from a host writer to identify available software components. The method can also involve receiving a request from the host writer to take a snapshot of one or more volumes hosted by the virtual machine with at least one of the available software components. In addition, the method can involve sending instructions to one or more application writers on the virtual machine to prepare corresponding one or more virtual machine applications for backup. Furthermore, the method can involve sending a signal to the host writer that snapshot preparations for each of the one or more volumes hosted inside the virtual machine have completed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates flowcharts of methods comprising a series of acts in accordance with implementations of the present invention from the perspectives of a host server and of a virtual machine for providing application-consistent backups of virtual machines installed on one or more host server volumes.

DETAILED DESCRIPTION

Implementations of the present invention extend to systems, methods, and computer program products configured to create consistent host-level backups of one or more virtual machines. In particular, implementations of the present invention provide the ability to backup a host server and corresponding one or more virtual machines using existing backup requestors and writers in a consistent fashion, without necessarily incurring significant interruptions to the operation of the one or more virtual machines. In one implementation, for example, a host server writer (e.g., a virtual server VSS writer) instructs each virtual machine to create one or more application-consistent snapshots of its own virtual machine-level volume data. The backup application on the host server also creates snapshots of the host-level volumes on which one or more virtual machines (e.g., a Virtual Hard Disk file thereof) are installed. The host server can then retrieve the previously created virtual machine-level snapshots from within the host-level snapshots, and finish backup processes.

One will appreciate after reading this specification and claims that a host server (e.g., through a virtual server writer) can also enable the creation of nevertheless consistent backups of virtual machines even if they cannot be readily identified as being configured for consistent (e.g., application and/or file system)-consistent backup processes. For example, the virtual machines may be turned off or otherwise not running, or the virtual machines may not be installed with the appropriate software or hardware components. Nevertheless, the host server can use different components to copy the host volumes and corresponding virtual machines in a manner that preserves state, and then pauses or stops the virtual machines at least momentarily. The host server writer can then allow the virtual machines to resume after the snapshot of the host volume(s) has/have been made.

One will appreciate after reading this specification and claims, that implementations of the present invention can provide for consistent backups of virtual machines in a way that minimizes downtime, and without requiring the purchase and installation of new backup agents. As such, organizations that implement virtual machine solutions can provide better host server, virtual machine, and data availability in a network system in a manner that minimizes an organization's resource expenditures.

Figure 1A:
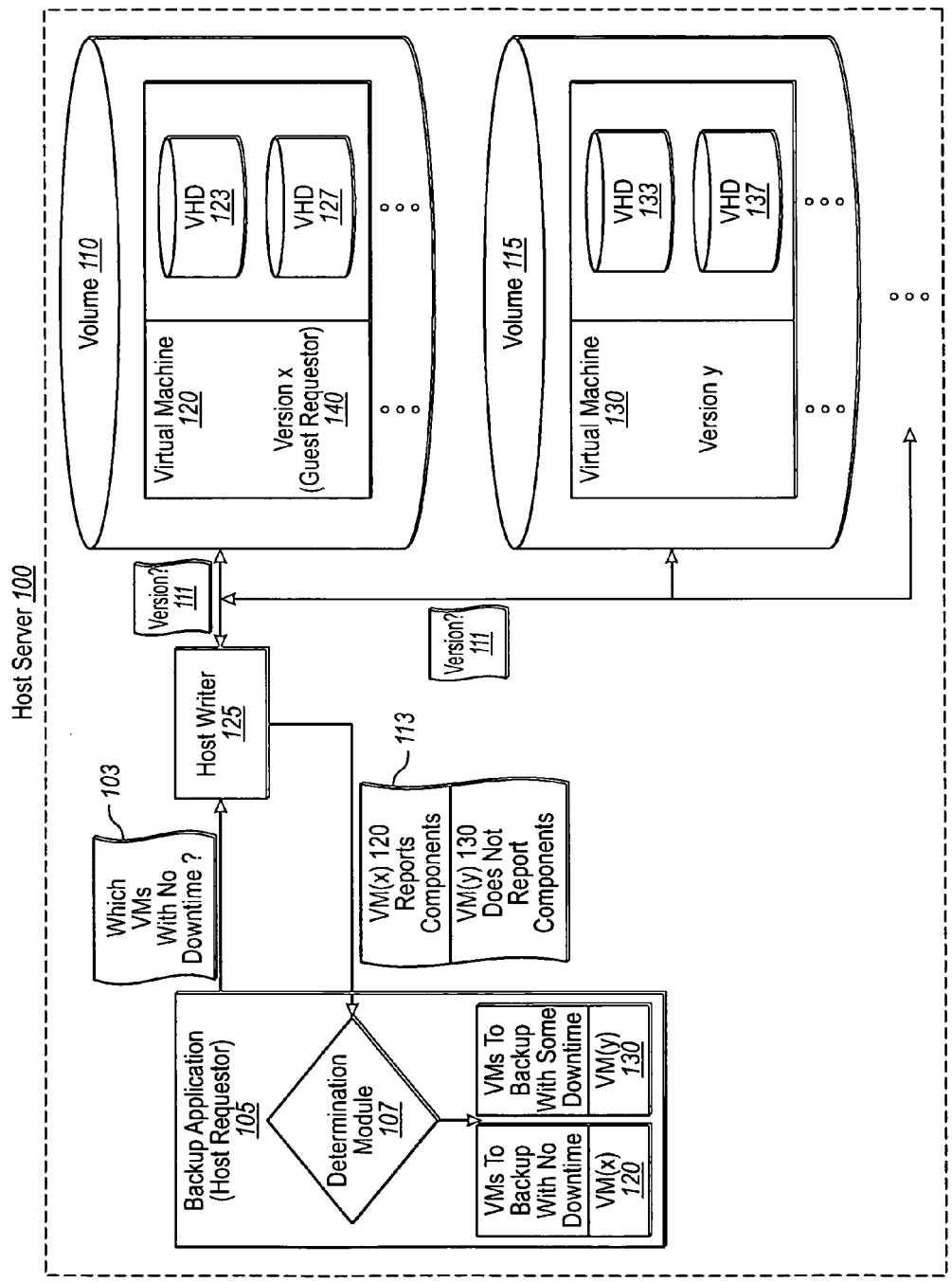
FIG. 1A illustrates an overview schematic diagram in accordance with an implementation of the present invention in which a host-level backup application identifies which one or more virtual machines can be backed up in a consistent manner.

Accordingly, FIG. 1A illustrates an exemplary host server 100 configured to manage volumes 110 and 115. Installed on volumes 110 and 115 are virtual machines 120 and 130, respectively. By way of explanation, although each virtual machine 120, 130 can be thought of as a separate computerized system on one level, each virtual machine 120, 130 can also be thought of as a collection of "files" (e.g., a Virtual Machine Configuration, or "VMC," file, and one or more virtual hard disk—"VHD"—files) when viewed from the level of host 100. In any event, although FIG. 1A illustrates one virtual machine per volume, this is not required, and there may be several virtual machines installed on any given host server 100 volume. Similarly, each virtual machine could span multiple volumes on one or more host servers.

Furthermore, each virtual machine can manage additional drives, which are effectively additional volume allocations within the volume allocation(s) on which the given virtual machine is installed. For example, FIG. 1A shows that virtual machine 120 also manages one or more virtual physical disks, which are nevertheless part of host volume 100. Generally, each virtual physical disk can also be represented by a file, such as a Virtual Hard Disk file (i.e., VHD 123, 127, etc.). In particular, the VHD file is exposed as a physical disk inside the virtual machine that can further comprise additional one or more volumes (not shown) contained therein, where each volume has its own Global Unique Identifier ("GUID"). Thus, VHD file 123 (which in this illustration contains only one volume for simplicity) might thus have a volume that appears as drive "m:\"—or some other unique identifier appropriate for a given operating system—while VHD 127 (which also in this case includes only one volume) might have a volume that appears on the network as drive "n:\" and so on.

In addition, FIG. 1A shows that host 100 comprises backup application 105, which can also be referred to as a "host requester," or "host-level requestor." Generally, backup application 105 comprises a series of computer-executable instructions configured to direct backup events at host 100. In one implementation, such as in the MICROSOFT operating environment for example, backup application 105 comprises a Volume Shadow Copy Service ("VSS") Requestor. FIG. 1A also shows that backup application 105, in turn, can be configured to direct its backup instructions through host writer 125, which can also be referred to as a "host writer," "host-level writer," or "host-level virtual server VSS writer."

Generally, host writer 125 comprises a series of computer-executable instructions configured to implement backup instructions received from backup application 105. In one implementation, such as in the MICROSOFT environment for example, host writer 125 can comprise a VSS Writer, such as the VSS writer used with MICROSOFT VIRTUAL SERVER. By way of explanation, reference herein to MICROSOFT components is exemplary only. In particular, one will appreciate after reading this specification and claims that the components, modules, systems, and functions described herein can be applied to a wide variety of components, modules, and functions used in other operating environments.

In order to perform consistent backups of the virtual machines, host 100 will generally need to determine which of the hosted virtual machines can report appropriate components configured to make consistent backups possible in the first place. As a preliminary matter, continued reference is made herein to "application-consistent" backup or snapshot processes. One will appreciate, however, that application-consistent backup processes are only one example of "consistent" backup operations in accordance with implementations of the present invention. Other examples of consistent backup processes include file system and/or crash-consistent backup processes.

In any event, and with reference to application-consistent backups, for example, some virtual machines might be installed with the appropriate writers and requesters for making application-consistent backups, while other virtual machines might be installed without the appropriate writers and requesters. For those virtual machines running without such appropriate components, host 100 can still backup those virtual machines, but might not necessarily do so in the same manner as those with the appropriate components. In particular, host 100 can be configured to backup those virtual machines that report the appropriate components with no downtime or interruption (or virtually none), and alternatively configured to backup those virtual machines that do not report (i.e., missing or not in operation) the appropriate components with at least some downtime or interruption.

Accordingly, FIG. 1A shows that backup application 105 (i.e., "host requestor") begins backup services at least in part by sending request 103 to host writer 125. In this case, request 103 instructs host writer 125 to identify which virtual machines can be backed up with "no downtime." For example, request 103 instructs host writer 125 to ascertain which of virtual machines 120, 130, etc. comprise the appropriate guest writers and/or requesters for performing an internal application-consistent backup. In one implementation in the MICROSOFT environment, for example, such components can include those compatible with "VM Additions" as used within a MICROSOFT VIRTUAL SERVER infrastructure.

These and other similarly configured virtual machine components are configured to interact from within a virtual machine with (and respond to instructions from), for example, a host-level virtual server VSS writer. FIG. 1A also shows that, upon receiving request 103, host writer 125 can communicate via message 111 (which can be, for example, a private Application Program Interface—"private API") with virtual machine 120, and identifies that virtual machine 120 reports components pursuant to "version x." For example, FIG. 1A shows that virtual machine 120 includes "Guest Requestor 140."

FIG. 1A also shows that host writer 125 further communicates (e.g., via message 111) with virtual machine 130, and that host writer 125 identifies that virtual machine 130 reports components pursuant to "version y." In this particular case, "version y" signifies that virtual machine 130 does not have the appropriate components for consistent backup processes. In response to its communications with the virtual machines (e.g., 120, 130, etc.), host writer 125 can send one or more messages of its gathered responses back to backup application 105. For example, writer sends message 113, which indicates that virtual machine 120 is of version "x," and reports the appropriate components, and further indicates that virtual machine 130 is of version "y," but does not report the appropriate components.

Upon receipt, FIG. 1A shows that backup application 105 can take message 113, and make its own determinations about which virtual machines to backup, and which virtual machines not to backup. For example, FIG. 1A shows that determination module 107 parses the information of message 113, places virtual machine 120 into the "VMs to Backup with No Downtime" category, and places virtual machine 130 into the "VMs to Backup with Some Downtime" (or VMs not to backup) category. In alternative implementations, host writer 125 simply makes its own determinations about what should or should not be backed up (or backed up with some downtime), and then reports such categorizations back to backup application 105. In any event, the illustrated categorizations do not necessarily mean that virtual machine 130 will not be backed up, per se. In most cases, this simply means that virtual machine 120 cannot be backed up in an appropriately consistent fashion, and virtual machine 130 might only be configured to be backed up a consistent fashion with some downtime. After categorizing each virtual machine, backup application 105 begins implementing backup processes.

Figure 1B:
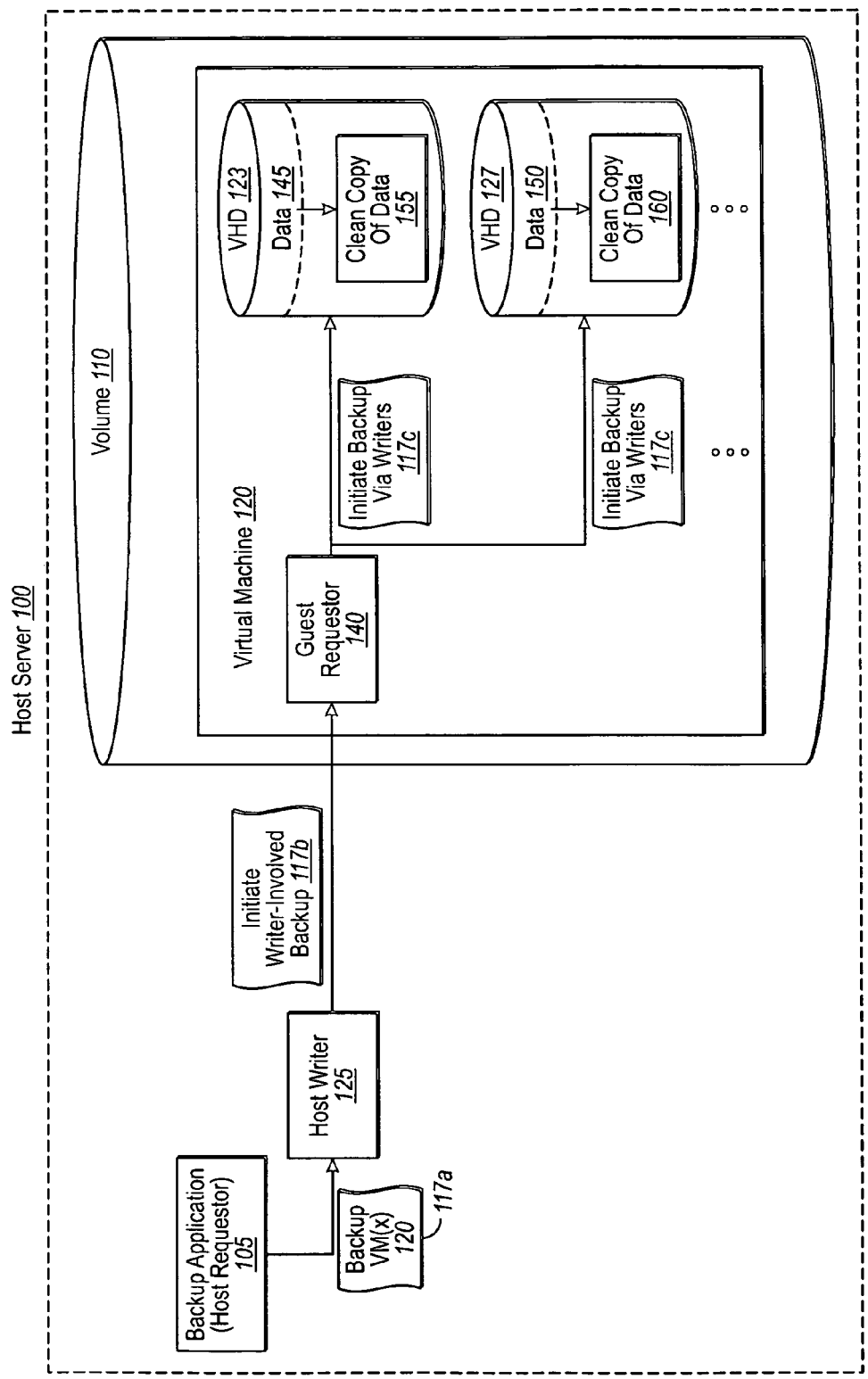
FIG. 1B illustrates the components of FIG. 1A, in which the host server initiates backup processes in conjunction with a virtual machine-level guest requestor in a virtual machine, in accordance with an implementation of the present invention.

As shown in FIG. 1B, for example, backup application 105 sends instructions 117a to host writer 125. Instructions 117a, in turn, tell host writer 125 to begin application-consistent backup processes at least with respect to virtual machine 120. Host writer 125 then prepares its own communication 117b, which tells a virtual machine to begin "writer-involved" backup processes. Host writer 125 then sends message 117b to each virtual machine (e.g., 120) indicated by backup application 105, and each indicated virtual machine in turn receives message 117b through its corresponding in-guest requester.

For example, FIG. 1B shows that guest requestor 140 of virtual machine 120 receives message 117b. In one implementation, host writer 125 can communicate (e.g., message 111, 117b, etc.) with guest requestor 140 through one or more private APIs, through Remote Procedure Calls ("RPCs"), or the like, though this is not required in all implementations. In other implementations, such as if host writer 125 and guest requestor 140 are located at separate network locations (or even different domains), host writer 125 can communicate with other appropriate communication interfaces and or components. In particular, one will appreciate that implementations of the present invention can also be practiced even when needing to backup a virtual machine from a remote location over a Wide Area Network.

In any event, and once triggered, guest requestor 140 thus begins backup processes of its volumes in accordance with backup application's 105 initial instructions. As shown in FIG. 1B, for example, guest requestor 140 sends a virtual machine-internal message 117c to applications installed on any volumes managed by virtual machine 120. Message 117c can include instructions for each application writer (e.g., a VSS writer, not shown) to prepare for application-consistent backup processes of each volume managed within the volumes contained in its physical disks (i.e., represented by VHD files 123, 127). Generally, each application writer can comprises computer-executable instructions that can be included in applications and services within the virtual machine, and which help provide application-consistent backups of the application data.

For applications that are running when receiving request 117c, the application writer might respond, for example, by preparing its data stores, and ensuring that no writes occur on the volume (e.g., 123, 127) while the snapshot is being created. To make data on the disk consistent, the application writer might also flush its buffers to disk, or write out in-memory data to disk. In addition, the application writer might provide information about the application name, icons, files to include or exclude, and a strategy to restore the files. For applications that are not running, the corresponding application writer may not respond to message 117c, and guest requestor 140 might thus assume that all data handled by the application writers on the volume are consistent, the databases are closed, and no additional effort is required to perform the backup.

Generally, an application writer in accordance with one or more implementations of the present invention can be associated with one or more components. Each component, in turn, can comprise a group of files (e.g., a database and a set of log files) that are to be copied up as a whole. Thus, each application writer will need to provide data of each component and each corresponding file of the component to an appropriate backup service (e.g., a virtual machine requestor—e.g., guest requestor 140). Each application writer can further provide information about restoring the data on a component-by-component (and hence component-file-by-component-file) basis. In one implementation, for example, host writer 125 can provide a list of files used to keep persistent information about the managed virtual machines (e.g., 120, 130, etc.) Host writer 125 might report, for example, for each virtual machine a path of a particular virtual machine configuration file, any paths of a virtual hard disk file, etc.

In any event, and in response to instructions 117c, FIG. 1B shows that the corresponding application writers within volumes 123 and 127 produce an application-consistent state of their volume data therein. The volume data reported by the relevant applications for the volume within the corresponding physical disk file (e.g., VHDs 123, 127) are encompassed in volume snapshots. For example, FIG. 1B shows that volume data 145 in VHD 123 are copied as "clean copy of data" 155, and data 150 in VHD 127 are copied as "clean copy of data" 160. Generally, these "clean" copies of data 155, 160 are consistent copies (e.g., volume shadow copy) of data within the guest volume snapshot, and generally do not constitute separate copies from the snapshot itself. In particular, "clean copies" 155, 160 are essentially application-consistent copies of volume data within the snapshots contained in the Virtual Hard Disk files (VHDs) 123 and 127 (FIG. 1A), respectively.

Once each appropriately configured virtual machine (e.g., 120) has made its own internal, application-consistent (or "clean") copy of its physical disk volumes (e.g., copy 155 of data 145), host writer 125 can allow backup application 105 to proceed making snapshots of the host volumes (e.g., 110) on which the appropriately configured virtual machines (e.g., 120) are installed. The virtual machine volume data inside of these host-level snapshots, however, are not necessarily application-consistent (i.e. "dirty" or "crash consistent").

Generally, "dirty" copies are those that cannot be guaranteed as application-consistent with respect to virtual machine volume data, at least in part since they do not invoke application writer-involved snapshot processes within the virtual machines. For example, host 100 can use host-level application writers (e.g., host writer 125) to backup volume 110 data with writer-involved processes, but, as previously mentioned, these host-level application writers will only copy the entire virtual machine files as they are viewed by the host. As a result, even if using host-level application writers to create application-consistent copies of host-level volume data, each underlying virtual machine could be undergoing various data changes at the time of making the host-level backup of volume 110.

Figure 1C:
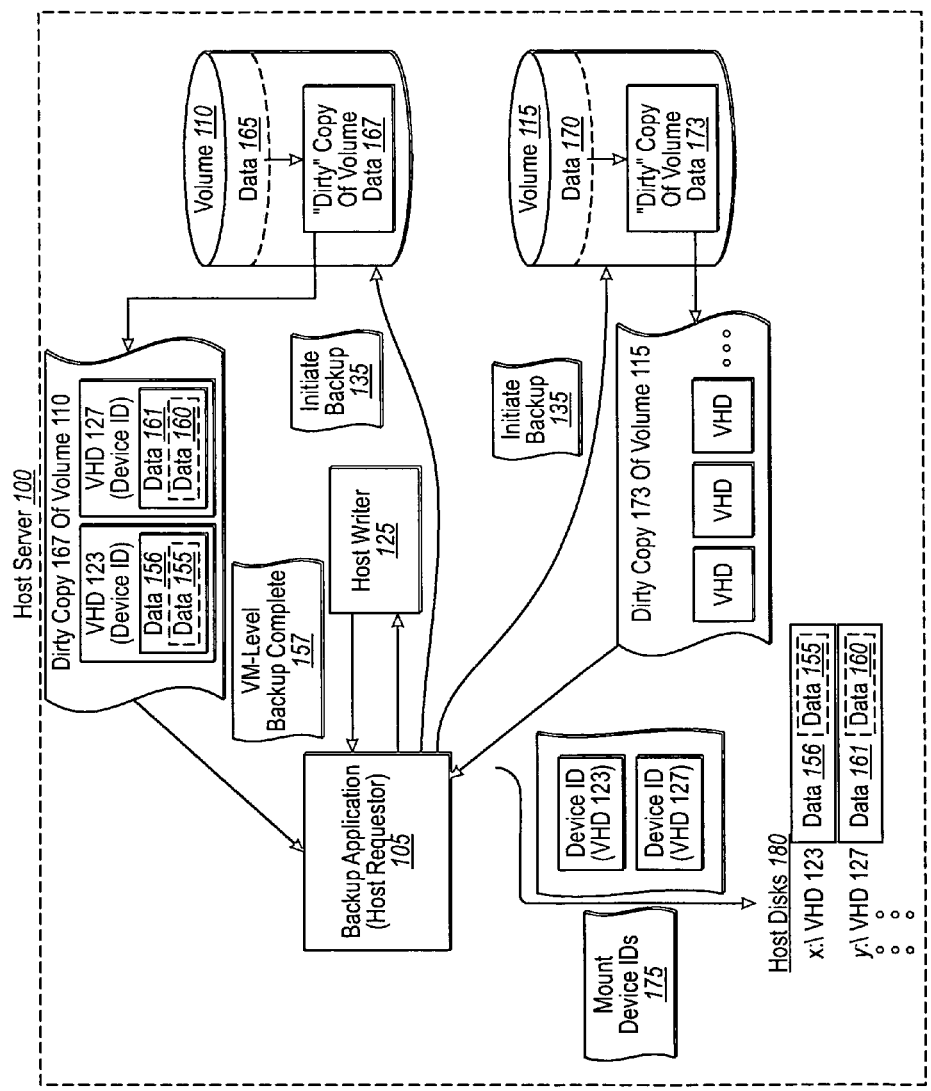
FIG. 1C illustrates the components of FIGS. 1A-1B, in which the host server requestor creates snapshots of the host volumes on which are installed the one or more virtual machines, such that the host-level snapshots also contain the virtual machine volume data, which in turn contain the virtual-machine level snapshots performed earlier by the virtual machines.

For example, FIG. 1C shows that host writer 125 sends message 157 to backup application 105, wherein message 157 indicates that backup of the virtual machines (e.g., 120) is complete. As such, backup application 105 can proceed making host-level snapshots of host volume 110 (and also volume 115, etc., if appropriate). In response, FIG. 1C shows in this example that backup application 105 initiates (e.g., signal 135) backup processes at volumes 110, 115, etc. In one implementation, for example, host requestor 105 initiates writer-involved backup processes and produces an application-consistent snapshot of the data on host-level volumes 110, 115 (i.e., application-consistent apart from virtual machine files) through a host-level VSS component (not shown).

For example, FIG. 1C shows that host 100 creates a snapshot 167, 173 of host volumes 110, 115. Snapshots 167, 173 also include copies of the virtual machine VHD files contained therein (i.e., VHD file 123 inside volume 110, etc.). Since, during the host-level snapshot, the virtual machines 120, 130 did not have their corresponding writers involved in the snapshot processes, the newer, host-level snapshots include VHD volume data (e.g., 156, 161) for the virtual machine-level volumes that are not application-consistent. Nevertheless, since the relevant virtual machine has already made an application-consistent copy of its volumes, VHD data 156 within host-level snapshot 167 includes the previously created (i.e., virtual machine-created) application-consistent snapshot 155. Similarly, VHD data 161 within host-level snapshot 167 includes the previously created (i.e., virtual machine-created) application-consistent snapshot 160. As mentioned above, the VHD data 156, 161 within host-level snapshot 167 (also 173) of VHD files 123, 127 are generally crash-consistent as a whole.

Upon creating host-level snapshots 167, 173 of the host-level volumes, host 100 will need to retrieve the virtual-machine level snapshot from within the host-level volume snapshots 167, 173. In one implementation, this involves reverting the host level VHD snapshot data 156, 161 back to the corresponding virtual machine-level snapshot data 155, 160. To do so, host writer 125 can first mount these host-level and virtual machine-level snapshots within the file system using any number of appropriate components to expose the underlying data. For example, backup application 105 can configure host writer 125 to make host snapshots 167, 173, etc. (and underlying VHD files snapshots) writable (rather than read-only). Furthermore, host writer 125 can obtain those device IDs for the host-level snapshots, and use those to identify the different "Device IDs" corresponding to the encapsulated VHD files (e.g., 123, 127).

Upon exposing the virtual machine VHD files from within the writable host-level snapshots 167, 173, host server 100 can then mount each device ID corresponding to a VHD file, so that each VHD file appears as a physical disk at the host level. In particular, host writer 125 can use the device IDs for VHD files 123 and 127 within the host snapshot in conjunction with an image mounter component to identify each volume within VHD files 123 and 127. For example, FIG. 1C shows that host server, (e.g., via host writer 125) sends instructions 175 to mount device IDs, including as arguments the device ID for VHD file 123 and VHD file 127. In one implementation with particular respect to the MICROSOFT operating environment for example, host 100 can use a "VHDImageMounter" component to receive and execute mounting instructions 175.

Mounting VHD files 123, 127 from within the host snapshot 167 in turn can expose the operating systems within those VHD files, which in turn allows the virtual-machine-level snapshots 155, 160 to be exposed on host server 100. In particular, mounting VHD files 123, 127 from within the host snapshot 167 of volume 110 in this case exposes the virtual machine-level snapshots 155, 160 inside the different VHD data 156, 161 of host snapshot 167. Thus, FIG. 1C also shows that host 100 mounts VHD file 123 inside host snapshot 167 as drive "x:\," which exposes VHD data 156, and further exposes the earlier-created virtual machine-level snapshot data 155 therein; and further mounts VHD file 127 from within host snapshot 167 as drive "y:\," where host snapshot 167 also includes VHD data 161, which has the earlier-created virtual machine-level snapshot data 160 exposed therein.

Figure 1D:
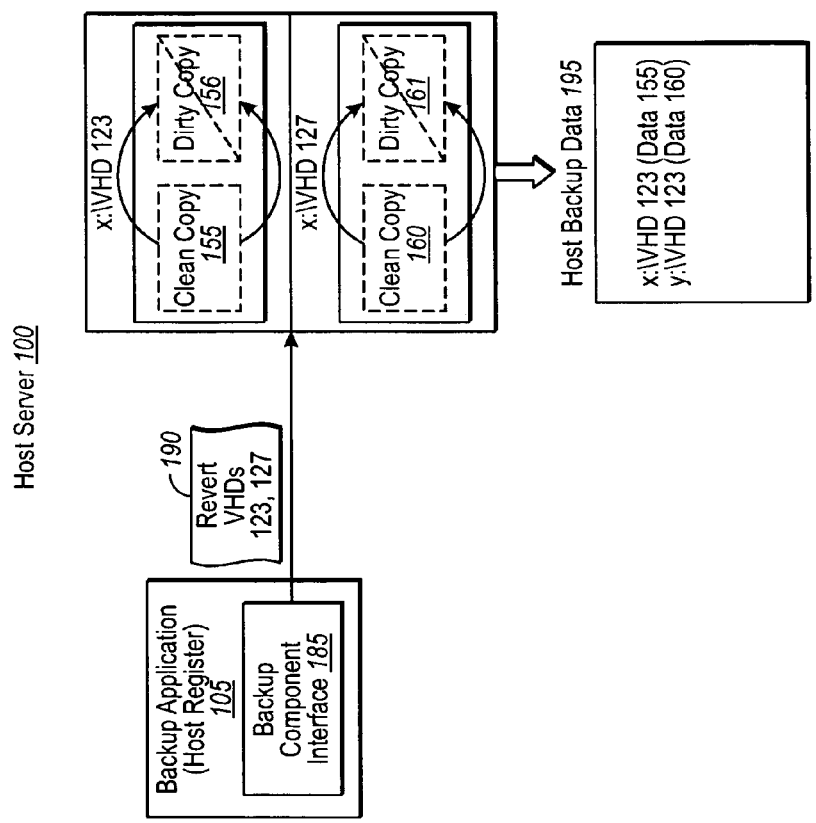
FIG. 1D illustrates an overview schematic diagram in accordance with an implementation of the present invention in which the backup application illustrated in FIGS. 1A-1C retrieves host-level snapshot data having virtual machine-level snapshot data contained therein.

Now that backup application 105 has mounted VHD files 123, 127 from within the host snapshot 167, backup application 105 can now revert the VHD data 156, 161 of the host-level snapshot 167 back to the VHD data 155, 160 of the virtual machine-level volume snapshots. As shown in FIG. 1D, for example, backup application 105 uses component interface 185 (e.g., a VSS component interface) to revert the dirty and clean snapshot data within drives "x" and "y." In one implementation, backup application 105 uses interface 185 to simply delete or overwrite VHD data 156, 161, and replace it with corresponding clean VHD data 155, 160.

Once making this replacement, backup application 105 has not only corrected or adjusted (i.e., reverted, replaced) the snapshot data of VHD files 123, 127, but also changed the overall host-level snapshot 167 so that its underlying virtual machine-level volume data are now fully consistent. That is, all virtual-machine data within the host-level snapshots can now also be considered application-consistent. Furthermore, control of the virtual machine-level snapshots 155, 160 has been placed into the control of host 100 backup processes. Thus, when host 100 makes its own application-consistent backup of its volume snapshots, this host-level backup can now include an application-consistent backup of each appropriately-configured virtual machine.

The above-identified components and processes are described primarily for the case in which the identified virtual machines (e.g., 120) provide a response that indicates configuration with the appropriate software components for creating a consistent backup. Specifically, such virtual machines (e.g., 120) can be backed up with little or no downtime. As previously mentioned, however, there may be alternative instances in which a given virtual machine provides no response since it is not running, or provides a response that indicates that it is not configured to make consistent backups. For example, virtual machine 130 might be running an operating system that does not include certain needed software components, such as the appropriate application writers (e.g., correct version of a shadow copy service), an appropriate guest requestor (e.g., 140) or the like. In such alternative instances, implementations of the present invention can still provide at least crash-consistent backups of the virtual machines (e.g., 130) that may or may not require at least some subsequent downtime if later needing to ensure the data are consistent.

For example, host writer 125 can call a communication interface (not shown) and instruct the interface to save all of the state of virtual machine 130 (and/or other similarly-limited virtual machines). In one implementation with particular respect to the MICROSOFT operating environment, for example, host writer 125 can call a Virtual Server Communication interface (i.e., "VS COM API," not shown). The communication interface can then report to host writer 125 when it has finished saving the virtual machine 130 state. In particular, the communication interface can report this to host writer 125, which in turn allows backup application 105 to create a snapshot of the corresponding host volume on which virtual machine 130 resides (i.e., volume 115).

In addition to saving virtual machine 130 state, the communication interface can also momentarily pause or stop virtual machine operations using any appropriate virtual and/or private APIs. If the communication interface identifies, for example, any changes to the virtual machine 130 state, the communication interface can report this information. Such a report can, in turn, fail the backup operations, and cause restart at a more appropriate time. In particular, the backup application 105 can continue to repeat these steps until backup application 105 has finished creating snapshots of volume 115 in a state of desired consistency.

Once backup operations are complete, host 100 has thus created an application-consistent copy of volume 110 and its corresponding virtual machines (e.g., 120), and has further created an consistent (i.e., at least crash-consistent) copy of volume 115 and its corresponding virtual machines (e.g., 130). One will appreciate that this copy of volume 115 can not only be crash-consistent, but also be "VHD-consistent" with respect to the state of the VHD file. In particular, saving virtual machine state can provide a valid and consistent VHD file that can be successfully recovered at a later point, as desired.

In still another implementation, components in accordance with the present invention can further include use of a hardware provider to provide many of the consistent snapshot functions described previously. When using a hardware provider, for example a "VSS Hardware Provider" (e.g., a plex/mirror provider), volume 110, 115 storage can reside on a "disk array" that is being "mirrored" in a separate location. When it is time to create the host-level snapshot (i.e., non-application-consistent for the virtual machine), the hardware provider can simply "break" the mirror between the volume and its corresponding mirror. This can expose the host-level snapshot as a separate, standalone disk device. Backup application 105 can then call any number of Virtual Disk Service ("VDS") and/or Volume Shadow Copy Server ("VSS") APIs to make the mirror of the volume writable, manipulate the mirror of the volume, and then expose and mount the underlying clean (i.e., application-consistent) snapshot data 155, 160. This type of hardware solution could also be used with remotely connected storage volumes, such as in a Storage Area Network ("SAN") environment to create application-consistent backups of virtual machines distributed over several storage mediums.

Along these lines, implementations of the present invention can further include use of, for example, guest requestor 140 to create a hardware-transportable, application-consistent snapshot inside a particular virtual machine (e.g., 120). For example, a component inside, for example, virtual machine 120 configured for snapshots of SAN volumes (e.g., an appropriately configured VSS component) can create a writer-involved snapshot (not shown) of a remote volume attached to the guest (e.g., virtual machine 120, 130), for which there is thus no host server 100 VHD file. Guest requestor 140 can then import the snapshot and surface the snapshot as a separate Logical Unit Number ("LUN") on the host server. Host writer 125 can then ask backup application 105 (i.e., a host requestor) to backup the LUN as part of backing up virtual machine 120. Backup application 105 can thus backup the entire LUN (i.e. the guest or virtual machine-level snapshot), such that reversion with, for example, a host-level snapshot of a virtual machine volume, would not be necessary.

Accordingly, FIGS. 1A-1D and the corresponding text provide a number of systems, components, and interfaces for providing efficient host-level backups of virtual machines in a consistent manner. In addition to the foregoing, implementations of the present invention can also be described in terms of methods comprising one or more acts for accomplishing a particular result. For example, FIG. 2 illustrates flow charts from the perspective of host 100 and virtual machine 120 for creating host-level, application-consistent backups of virtual machines. The methods and corresponding acts of FIG. 2 are described below with reference to the systems and components of FIGS. 1A-1D.

For example, FIG. 2 shows that a method from the perspective of host 100 of creating an application-consistent backup of each of one or more virtual machines without necessarily requiring stopping or pausing of the one or more virtual machines, comprises an act 210 of identifying one or more virtual machines on a host. Act 210 includes identifying at least one virtual machine having one or more components for writer-involved backup processes. For example, backup application 105 (i.e., "host requester" 105) asks (via message 103) host writer 125 what virtual machines are present on host 100, and which of these virtual machines can be backed up in an application-consistent manner (i.e., with little or no downtime).

Host writer 125, e.g., a VSS writer, sends corresponding version request 111 to each virtual machine (e.g., 120, 130), and identifies what software components exist to aid the backup processes (e.g., guest requestor 140), such as components that can be used for creating application-consistent backups. Host writer 125 then sends corresponding response 113 to backup application 105. Backup application 105 then determines, e.g., via determination module 107, which of the identified virtual machines can be backed up using application-consistent methods (i.e., "VMs to Backup," which include the appropriate components), and those to be backed up using other methods (i.e., "VMs to Backup with Some Downtime") which do not include the appropriate components, or are turned off).

Accordingly, FIG. 2 further shows that a method from the perspective of virtual machine 120 of creating a consistent backup of one or more virtual machine volumes comprises an act 210 of receiving a request to identify components. Act 210 includes receiving a request from a host writer to identify available software components. For example, virtual machine 120 (e.g., via guest requestor 140) receives version request 111, which includes a request to identify if virtual machine 120 includes a guest requestor and one or more application writers (and/or appropriate versions thereof), as these would be appropriate components for creating an application-consistent backup. Virtual machine 120 then returns a corresponding response, which host writer 125 formats as message 113 and sends to backup application 105.

In addition, FIG. 2 shows that the method from the perspective of host 100 comprises an act 220 of sending a backup request to the set of virtual machines. Act 220 includes sending an instruction to each of the one or more virtual machines to prepare one or more machine-level snapshots of one or more virtual machine volumes. As shown in FIG. 1B, for example, backup application 105 sends instructions 117a to backup virtual machine 120 to host writer 125, where virtual machine 120 is part of a set of virtual machines that has appropriate components for creating application-consistent snapshots with little or no downtime. Host writer 125, in turn, sends instructions 117b to initiate writer-involved backup preparations to guest requestor 140 at virtual machine 120.

Accordingly, FIG. 2 shows that the method from the perspective of virtual machine 120 also comprises an act 230 of receiving a snapshot request from a host writer. Act 230 includes receiving a request from the host writer to create a snapshot of one or more volumes hosted by the virtual machine with at least one of the available software components. For example, guest requestor 140 receives message 117b from host writer 125, where message 117b includes a request to begin writer-involved snapshot processes. As such, virtual machine will begin preparing a snapshot of its volumes managed by each VHD file (e.g., 123, 127, etc.).

In addition, FIG. 2 shows that the method from the perspective of virtual machine 120 comprises an act 240 of sending backup instructions to one or more application writers. Act 240 includes sending instructions to one or more application writers on the virtual machine to prepare corresponding one or more virtual machine applications for a snapshot. For example, FIG. 1B shows that guest requestor 140 sends message 117c to the application writers (not shown) on volumes within VHD files 123, 127. In one implementation, this can involve sending request to writers corresponding to such applications as database, e-mail, or other similar applications to prepare for a snapshot of the relevant volume data.

Furthermore, FIG. 2 shows that the method from the perspective of virtual machine 120 comprises an act 250 of sending a signal indicating completion of the virtual machine snapshots. Act 250 includes sending a signal to the host writer that snapshot operations for each of the one or more volumes hosted within the virtual machine have completed. For example, upon completion of virtual machine snapshot activities, guest requestor sends a completion signal (not shown) to host writer 125. In response to this signal, host writer 125 can then send message 157 to backup application 105, telling backup application 105 to finish host-level snapshot operations.

Accordingly, FIG. 2 also shows that the method from the perspective of host 100 comprises an act 260 of identifying completion of the virtual machine snapshots. Act 260 includes identifying that snapshot operations at the at least one virtual machine have completed. For example, as previously mentioned, host writer 125 sends message 157, which indicates that virtual-machine level snapshots have completed.

In addition, FIG. 2 shows that the method from the perspective of host 100 comprises an act 270 of creating one or more host-level snapshots. Act 270 includes creating one or more host-level snapshots of one or more host volumes on which the at least one virtual machine is installed. For example, backup application 105 sends instructions (e.g., 135) to continue backup processes at host volumes 110, 115. As shown in FIG. 1B, this can result in a host snapshot 167 that includes non-application-consistent VHD file 123, 127 data 156, 161. As discussed herein, the different VHD data of the host-level snapshot 167, while not necessarily being application-consistent for the VHD files 123, 127, nevertheless include the previously created application-consistent VHD snapshot data 155, 160. In particular, the host-level snapshot 167 of volume 110 could be application-consistent in all other respects except for VHD files 123, 127, etc.

In another implementation, such as with hardware providers, host-level snapshots can be made in the case of mirrored host-level volumes by breaking the mirror between the host volume(s) on which a virtual machine is installed and the corresponding mirror volume. The mirror volume thus comprises a snapshot of the host volume. This snapshot also comprises the previously taken virtual machine-level snapshots of its one or more volumes, where the virtual machine-level snapshots are application-consistent. The virtual-machine level snapshot can thus be retrieved from the host's mirror volume.

Furthermore, FIG. 2 shows that the method from the perspective of host 100 comprises an act 280 of retrieving the virtual machine-level snapshots encapsulated inside the VHD files of the host snapshot. Act 280 includes retrieving the one or more virtual machine-level snapshots of the one or more virtual machine volumes from the one or more host-level snapshots of the one or more host volumes. For example, as shown in FIG. 1D, host 100 can replace (e.g., via a VSS component) host-level VHD snapshot data 156 within VHD 123 with virtual machine-level VHD snapshot data 155. Similarly, host 100 can replace host-level VHD data 161 within VHD 127 with virtual machine-level VHD snapshot data 160. Alternatively, in the case of a hardware provider (i.e., breaking a mirror between a host volume and a mirror volume), the virtual machine-level snapshot can be exposed and retrieved from the mounted mirror volume, as previously described. In either case, the host-level backup data (e.g., 195) can thus be based at least in part on virtual machine-level snapshot data.

Accordingly, FIGS. 1A-2, and the corresponding text, provide a number of systems, components, and mechanisms that can be used to create appropriately consistent backup copies of virtual machines on one or more host volumes. As described herein, components in accordance with the present invention can be used to create consistent backups of virtual machines that do not require downtime of the virtual machine, nor require the purchase of additional backup agents that need to be separately installed and managed. Furthermore, components as described herein can take advantage of conventional shadow copy services to generate a consistent snapshot of a virtual machine, and then retrieve the virtual machine snapshot from within the host-level snapshot.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of creating an application-consistent backup of data on a host system comprising one or more virtual machines and one or more storage devices, the method comprising:
   sending a first instruction to a virtual machine to prepare application-consistent snapshots of one or more virtual machine volumes;
   sending, by a guest requestor running within the virtual machine, to one or more applications running within the virtual machine, a second instruction to prepare an application-consistent snapshot of application-reported volume data;
   writing, by an application writer running within a virtual machine, a first state data comprising an application-consistent snapshot of application-reported volume data, to a virtual hard drive;
   generating a snapshot of the host storage device, the snapshot containing a second state data comprising data that is not application-consistent;
   retrieving the first state data from the snapshot of the virtual hard drive; and
   overwriting the second state data in the snapshot of the host storage device with the first state data.

2. The method as recited in claim 1, further comprising:
   converting the host-level snapshot of the storage device from read-only data to writable data.

3. The method as recited in claim 1, further comprising:
   mounting the virtual hard drive as a drive in a host.

4. The method as recited in claim 1, wherein the second state data includes a copy of data associated with the application that was previously written from application buffers to the virtual hard drive prior to generating the snapshot.

5. The method as recited in claim 1, further comprising:
   stopping application writes associated with the application during a time period where first state data is written to the virtual hard drive.

6. The method as recited in claim 1, wherein execution of the virtual machine is paused while the snapshot of the storage device is generated.

7. The method as recited in claim 1, further comprising:
   saving state for the virtual machine.

8. The method as recited in claim 7, further comprising:
   momentarily pausing the virtual machine.

9. The method as recited in claim 1, wherein the storage device includes a plurality of virtual hard drives for a plurality of virtual machines.

10. The method as recited in claim 1, wherein the virtual machine is stored in a plurality of files on the storage device.

11. The method as recited in claim 1, wherein the virtual machine is executing on a remote computer system.

12. The method as recited in claim 1, wherein the storage device is a storage area network target.

13. A computer system, comprising:
    a processor coupled to a computer readable storage medium, the computer readable storage medium comprising:
    instructions for executing an application on a virtual machine, the virtual machine including a virtual machine volume, the virtual machine volume stored as a file on a host volume;
    instructions for generating, by the application and while the virtual machine is active, an application-consistent snapshot of the executing application by at least preventing application writes while the snapshot is being generated;
    instructions for storing the application-consistent snapshot of the executing application in the virtual machine volume;
    instructions for generating a snapshot of the host volume, the snapshot of the host volume comprising a crash-consistent snapshot of the executing application; and
    instructions for replacing the crash-consistent snapshot with the application-consistent snapshot.

14. The computer system of claim 13, wherein the computer readable storage medium further comprises:
    instructions for retrieving the application-consistent snapshot of the executing application.

15. The computer system of claim 13, wherein the computer readable storage medium further comprises:
    instructions for mounting the virtual machine volume as a drive on a host.

16. A computer readable storage medium including computer executable instructions for creating an application consistent backup of at least one virtual machine, the computer readable storage medium comprising:
    instructions for sending an instruction to the virtual machine to generate virtual machine-level snapshots for applications executing on the virtual machine, the instructions for generating the virtual machine-level snapshots include instructions for writing, by application writers running within the virtual machine, first state data comprising application-consistent data for applications executing on the virtual machine to application state files stored in a virtual hard drive, the virtual hard drive being stored as a file on a host volume;
    instructions for creating a host-level snapshot of the host volume on which the virtual machine is installed, the host-level snapshot including the file for the virtual hard drive, the file for the virtual hard drive including the first state data for the applications and second state data for the applications, the second state data comprising data that is not application-consistent;
    instructions for retrieving the first state data for the applications from the virtual machine-level snapshot; and
    instructions for replacing, in the host-level snapshot, the second state data with the first state data.

* * * * *